March 23, 1965 H. C. JENNINGS 3,174,800
WHEEL CHAIR ARM LOCK
Filed Jan. 14, 1963

HARRY C. JENNINGS
INVENTOR.

BY Hazard & Miller

ATTORNEYS.

United States Patent Office 3,174,800
Patented Mar. 23, 1965

3,174,800
WHEEL CHAIR ARM LOCK
Harry C. Jennings, Los Angeles, Calif., assignor to Everest & Jennings, Inc., Los Angeles, Calif., a corporation of California
Filed Jan. 14, 1963, Ser. No. 251,311
5 Claims. (Cl. 297—416)

This invention relates to a releasable lock for telescoping tubular members and is particularly adaptable for use on a wheel chair having a tubular frame including a removable arm, wherein a portion of the arm has telescopic engagement with the upper end of a vertical frame member which supports the arm.

One of the objects of the invention is to provide a lock which is spring biased and which normally will snap into locking engagement with the telescoping members and yet which can be readily released, and wherein means is provided whereby the locking pin may, if desired, be conveniently shifted to a position where the locking pin may be maintained in an unlocked or released position.

More specifically it is an object of the invention to provide a lock which includes a locking pin and a spring therefor wherein the spring and pin can be shifted longitudinally of the telescoping members to move the locking pin into and out of registry with openings through the two members.

The above and other objects and advantages will more fully appear from the following description in connection with the accompanying drawing, in which.

Figure 1:
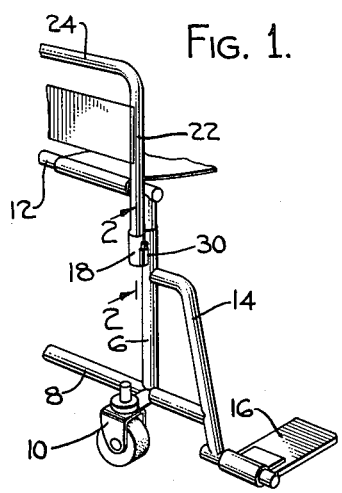
FIG. 1 is a perspective view of a portion of a wheel chair showing the lock thereon.
Figure 2:
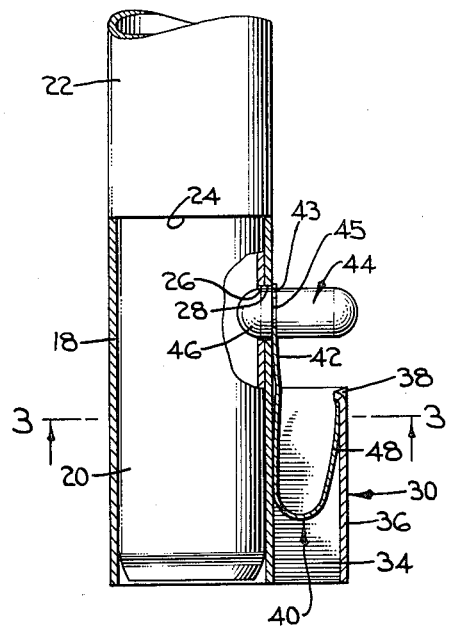
FIG. 2 is an enlarged detail partially in section taken approximately on the line 2—2 of FIG. 1.

In FIG. 1 there is shown a vertical front side frame member 6 of a wheel chair structure. The side frame also has a lower horizontal frame member 8 supported by a caster wheel 10 and an upper horizontal frame member 12. The front portion 6 of the side frame carries a footrest support 14 and a footrest 16. As shown in FIG. 2 the upper end of the front vertical side portion 6 has secured thereto as by welding a tubular socket 18 which is adapted to receive the reduced and tapered lower end 20 of a front vertical arm member 22, said arm member including a similar vertical rear portion, not shown, and a connecting upper horizontal portion 24, as shown in FIG. 1.

Figure 3:
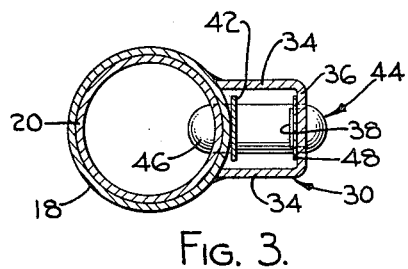
FIG. 3 is a transverse sectional view taken approximately on the line 3—3 of FIG. 2.

The reduced lower end portion 20 of the arm member 22, where it meets said arm member, provides a shoulder 24 which rests upon the upper end of the tubular socket 18. Furthermore, said reduced portion 20 is provided with a circular aperture 26 which is in registry with a cooperating aperture 28 in the tubular socket 18. Mounted just below the aperture 28 is a spring mount 30 which includes a pair of spaced webs 34 secured to and extending outwardly from the tubular socket 18 in parallel relationship, as shown in FIG. 3. The webs 34 are connected by a bridge 36 which is provided with a relatively smooth interior or undersurface. At the end of the bridge 36 more nearly adjacent the aperture 28, the bridge is provided with an interior abutment which may conveniently be in the form of a pushed in portion 38.

Figure 5:
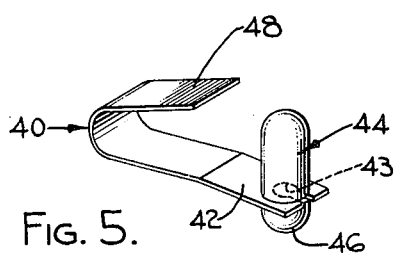
FIG. 5 is a perspective view of the locking pin and spring per se.

Located within the spring mount 30 is a locking spring 40 which is shown bent upon itself and which has a leg 42 extending from the end of the spring mount 30 and upon the end of each is secured a locking pin 44. The spring arm 42 is shown in FIG. 5 in dotted lines to have a keyhole slot 43. The locking pin 44 is provided with a fairly deep circumferential groove 45, shown in FIG. 2, which cooperates with the keyhole slot 43 to hold the locking pin on the end of the spring. The inner end 46 of the locking pin 44 is rounded so that it will slip easily into and through the aligned apertures 26 and 28 in the reduced arm member 20 and the tubular socket 18.

The spring 40 has its outwardly positioned second leg 48 in engagement with the smooth interior or undersurface of the bridge 36 of the spring mount 30, and in the locked position of the pin 44, the end 48 of the spring 40 is in engagement with the abutment 38 at the upper end of the bridge 36.

When removal of the wheel chair arm 24 is desired, the occupant or an attendant need only press downwardly and outwardly on the outwardly projecting end of the locking pin 44 causing the longer spring leg 42 to flex outwardly so that the inner rounded portion 46 of the locking pin will slip out of the aligned apertures 26 and 28. With the locking pin thus removed, the inner telescoping lower arm member 20 can be pulled out of the tubular socket 18.

Figure 4:
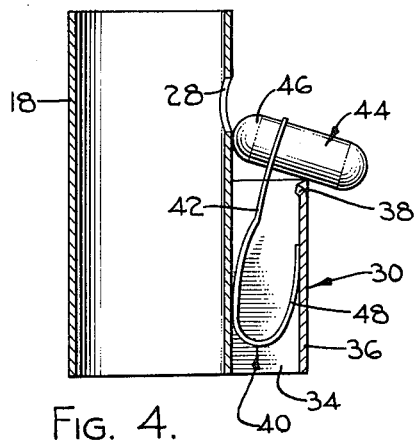
FIG. 4 is an enlarged sectional detail of the outer telescoping element shown in FIG. 2 with the locking pin and its spring shown shifted to a position where the locking pin is held in its released position.

Sometimes it is desirable to maintain the locking pin 44 in an unlocked position. In such case the locking pin is swung outwardly from the openings 26 and 28 and the locking pin then pushed downwardly, causing the spring 40 to slide downwardly in the spring mount 32. Then the rounded end 46 of the locking pin will rest against the wall of the tubular socket 18 just below the aperture 28, as shown in FIG. 4. Conversely, the locking pin can be restored to its operative locking position merely by pushing upwardly on the locking pin, causing it and the spring 40 to slide upwardly until the locking pin drops into the aperture 28.

It will of course be understood that various changes can be made in the form, details, arrangement and proportions of the various parts without departing from the spirit of the invention.

I claim:

1. In a wheel chair, a side frame having a front portion, an upwardly open socket member on said front portion, an arm having a downwardly disposed member removably receivable in said socket member, said socket member and the downwardly disposed arm member having registerable locking pin receiving means, a locking pin mount carried by one of said members, a locking pin shiftably carried by said mount for movement into and out of registry with said locking pin receiving means, and a spring element carried by said mount and shiftable in a direction parallel to the longitudinal axis of said members, said locking pin being secured to and biased by said spring elment toward said members in a direction transversely of the members to yieldably hold the locking pin in said locking pin receiving means.

2. The structure in claim 1, and the inner end of the locking pin being rounded.

3. The structure in claim 1, and the spring mount comprising a pair of side webs secured to and extending outwardly from one of the members and having a connecting bridge, said spring element being confined between said side webs and below said bridge in slidable relation thereto, providing a reaction base for said spring.

4. The structure in claim 2, and said side webs being substantially parallel and the underside of said connecting bridge being flat and said spring element being bent upon itself and held in said mount by its inherent resiliency.

5. The structure in claim 1, and said mount comprising a pair of substantially parallel side webs secured to and extending outwardly from one of said members and an interiorly flat bridge between the webs in spaced relation to one of said members, said spring element comprising a spring leaf bent upon itself and lying between said webs and beneath said bridge, one end of said spring leaf extending from said mount and having said locking pin thereon, the other end of said spring leaf overlying the first mentioned end thereof and bearing against the interiorly flat under side of said bridge, said spring leaf being slidable longitudinally of one of said members and said bridge between said side webs, and the underside of said bridge having an abutment at one end thereof to be engaged by the overlying end of said spring leaf and limit sliding movement of the spring in one direction.

References Cited by the Examiner
UNITED STATES PATENTS

| | | | |
|---|---|---|---|
| 2,389,811 | 11/45 | Ozlek | 287—119 |
| 2,559,469 | 7/51 | Scheidemantle | 287—119 |
| 2,592,449 | 4/52 | Miller | 297—429 |
| 2,653,649 | 9/53 | Linquist | 297—416 |
| 2,771,089 | 11/56 | Magida | 135—50 |
| 2,900,041 | 8/59 | Leavitt et al. | 287—58 |
| 3,002,200 | 10/61 | Murcott | 5—331 |

FRANK B. SHERRY, *Primary Examiner.*